Oct. 11, 1966    W. STRAUSS    3,277,522
STRIPPER COMB ASSEMBLY
Filed Nov. 15, 1963    3 Sheets-Sheet 1
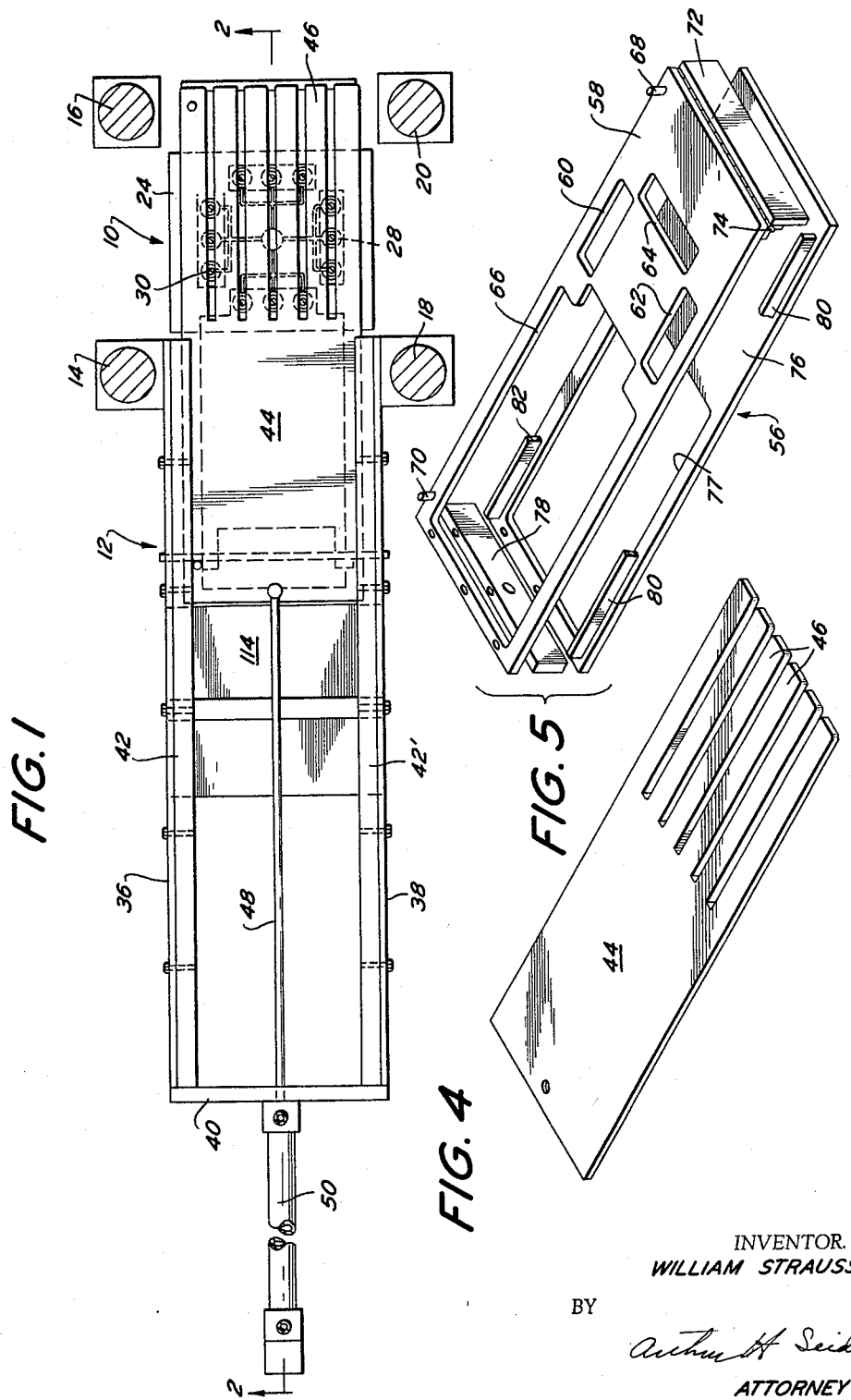
INVENTOR.
WILLIAM STRAUSS
BY
Arthur H. Seidel
ATTORNEY

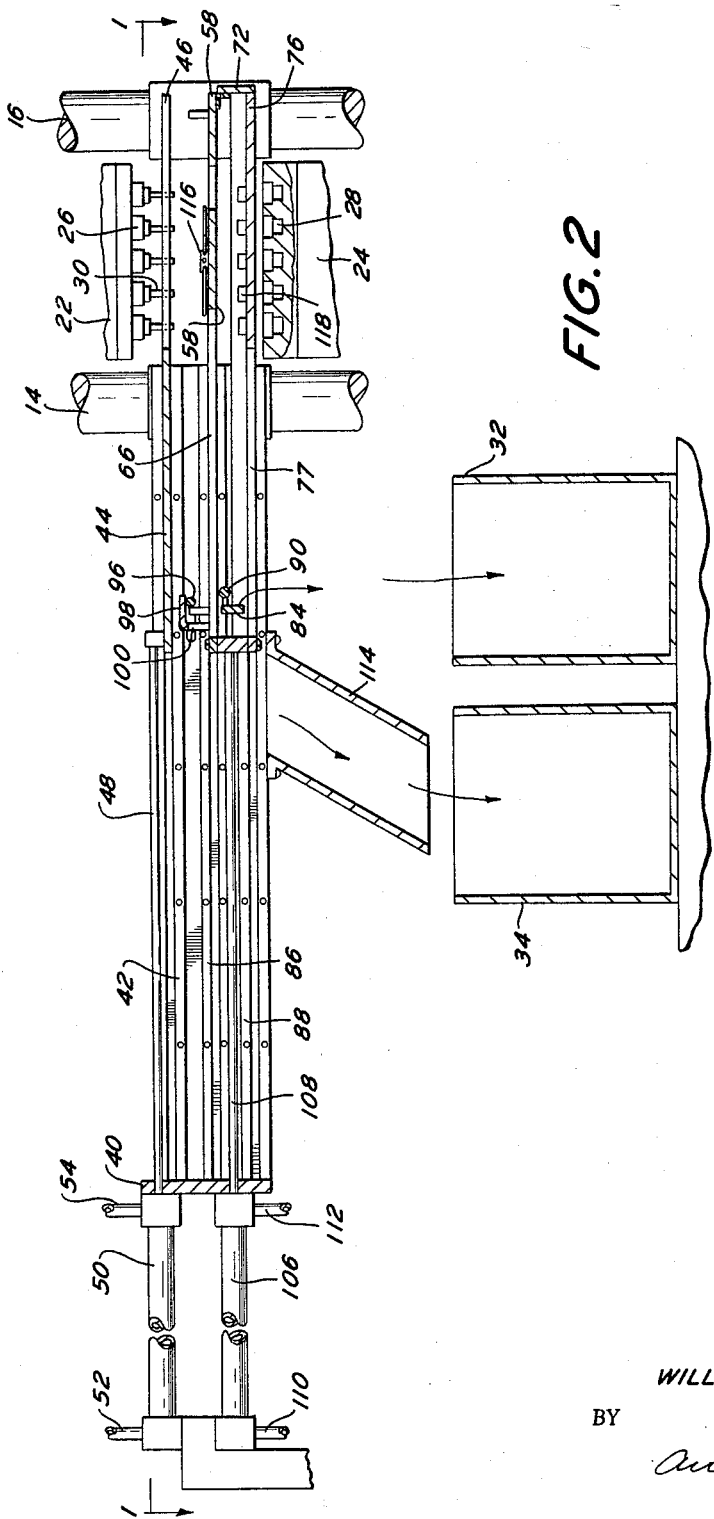

Oct. 11, 1966 W. STRAUSS 3,277,522
STRIPPER COMB ASSEMBLY
Filed Nov. 15, 1963 3 Sheets-Sheet 3
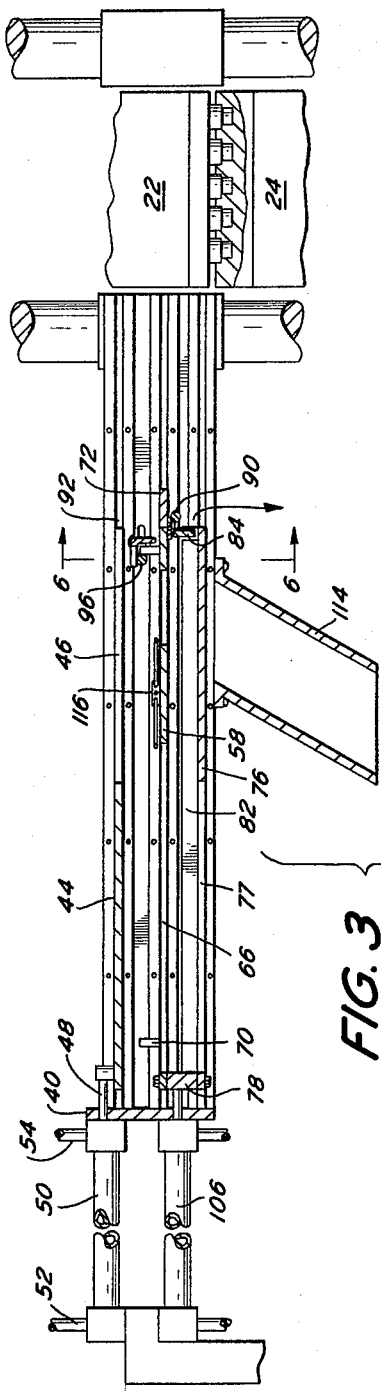
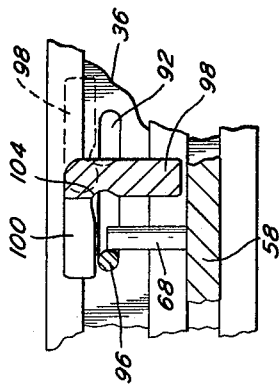
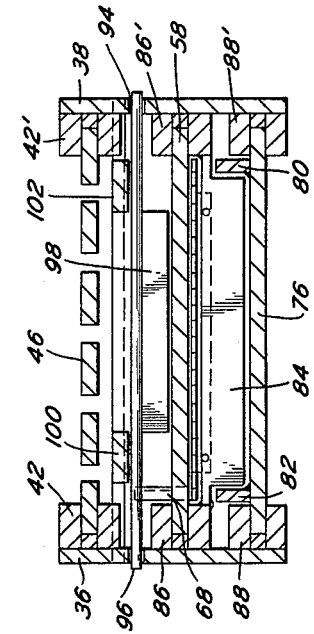
INVENTOR.
WILLIAM STRAUSS
BY
Arthur H Seidel
ATTORNEY United States Patent Office 3,277,522
Patented Oct. 11, 1966

3,277,522
STRIPPER COMB ASSEMBLY
William Strauss, Philadelphia, Pa., assignor, by mesne assignments, to Pennsalt Chemicals Corporation, Philadelphia, Pa., a corporation of Pennsylvania
Filed Nov. 15, 1963, Ser. No. 323,932
10 Claims. (Cl. 18—2)

This invention relates to a stripper comb assembly and, more particularly, to such an assembly having prime utility for use with molding presses.

The stripper comb assembly of the present invention may be utilized with any one of a wide variety of molding presses, such as the molding presses illustrated in my Patents 2,583,891; 2,739,349; 2,923,976, or with other types of conventional presses. The stripper comb assembly of the present invention is particularly adapted for use in molding presses wherein it is desired to automatically separate the molded article from the cull and runner.

In accordance with the present invention, the stripper comb assembly includes a reciprocally mounted tray assembly having upper and lower apertured plates. After the stripping operation, the cull and runner will be disposed on the upper plate and the molded parts will have passed through an aperture in the upper plate onto the lower plate. To provide positive assurance that the cull, runner and molded parts have separated from the ejection pins, a comb plate having fingers is provided above the tray assembly for cooperation with the ejection pins as will be made clear hereinafter.

The comb plate and tray assembly are each individually provided with a motor means to facilitate reciprocation of the same in timed relationship. As will be made clear hereinafter, the cull and runner will be supported by the tray assembly in a plane above the plane of the molded parts. When the tray assembly is reciprocated to the rear, away from the mold cavities, the molded parts will automatically be caused to discharge into a container or the like. When the tray assembly is reciprocated toward the mold cavities, the cull and runner will be caused to discharge into a second container or the like. The means and relationships which facilitate this automatic separation and discharge of the products from the mold cavities will be made clear hereinafter.

It is an object of the present invention to provide a molding press having a stripper comb assembly capable of automatically separating molded parts from the cull and runner for discharge into separate containers or the like.

It is another object of the present invention to provide a novel stripper comb assembly for automatically separating and discharging molded parts, culls and runners into separate containers or the like.

It is still another object of the present invention to provide a stripper comb assembly wherein molded parts will be separated from culls and runners and conveyed away from the mold cavities in two different planes for discharge into separate containers, or the like.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a top plan view of the stripper comb assembly of the present invention illustrated in conjunction with a portion of the molding press shown partially in section.

FIGURE 2 is a transverse sectional view taken along lines 2—2 in FIGURE 1.

FIGURE 3 is a sectional view similar to FIGURE 2 but illustrating the tray assembly and comb plate in a retracted position.

FIGURE 4 is a perspective view of the comb plate.

FIGURE 5 is an exploded view, partly broken away, of the tray assembly.

FIGURE 6 is a sectional view taken along lines 6—6 in FIGURE 1.

FIGURE 7 is an enlarged detailed view of elements illustrated in FIGURE 3 and showing more clearly the gate and the elements for causing operation of the same.

Referring to the drawing in detail, wherein like numerals indicate like elements, there is shown in FIGURE 1 a portion of a molding press designated generally as 10 and having a stripper comb assembly 12 associated therewith. The press 10 may be any one of a wide variety of known presses. As illustrated, the press includes columns 14, 16, 18 and 20 which support and facilitate movement of the first platen 22 toward and away from the second platen 24. The platens 22 and 24 may be provided with heated die plates.

As shown more clearly in FIGURE 2, the platen 22 supports a plurality of forces 26 adapted to extend partially into the die cavities 28. An ejection pin 30 extends through and is reciprocally supported by each of the forces 26. As will be more evident from FIGURE 1, the die cavities 28 are arranged in sets of three which form a rectangle. This arrangement is solely for the purpose of illustration since other arrangements may be utilized with equal effectiveness.

The stripper comb assembly 12 is adapted to convey the molded parts, cull and runner from a position between the platens 22 and 24 and discharge the molded parts into a container 32 and discharge the remainder into a container 34. The stripper comb assembly 12 includes a pair of stationary spaced parallel side plates 36 and 38 as shown more clearly in FIGURE 6. The side plates 36 and 38 are interconnected together at their lefthand end in FIGURE 2 by an end plate 40. Adjacent their upper edges, the plate 36 is provided with a pair of guides 42 and the plate 38 is provided with a pair of guides 42'. The guides 42 and 42' reciprocally support a comb plate illustrated more clearly in FIGURE 4. The comb plate is provided at its righthand end with a plurality of spaced fingers. The gaps between the fingers 46 are adapted to receive one or more of the ejection pins 30 as illustrated more clearly in FIGURE 1.

The comb plate 44 is provided with a separate actuator. The actuator includes a piston rod 48 extending through end plate 40. One end of piston rod 48 is connected directly to the comb plate 44. The other end of piston rod 48 is connected to a piston disposed within the cylinder 50. A motive fluid may be introduced into the cylinder 50 on opposite sides of the piston by way of conduits 52 and 54.

A tray assembly designated generally as 56 and illustrated more clearly in FIGURE 5 is reciprocally supported by the side plates 36 and 38. The tray assembly 56 includes an upper plate 58 of approximately the same size as comb plate 44. Plate 58 is provided with spaced apertures 60, 62 and 64 arranged so as to correspond with three of the sets of die cavities. Plate 58 is also provided with an enlarged aperture 66 having a reduced width portion opposite aperture 64. An upright pin 68 is fixedly secured to the plate 58 adjacent the end thereof which is closest to the die cavities. A second upright pin 70 is fixedly secured to the plate 58 adjacent the end thereof which is closest to the end plate 40. It will be noted that the pins 58 and 70 are adjacent the side edge of plate 58 which is closest to the side plate 36, see FIGURE 5 and 6.

The tray assembly 56 includes an end wall 72 pivotably coupled to the end of plate 58 by means of hinge 74. The tray assembly 56 includes a bottom plate 76 juxtaposed to the plate 58 and spaced therefrom by a distance corresponding generally to the height of the end wall 72. Plate 76 is provided with an enlarged aperture 77 corresponding generally to the size of aperture 66. The plates 58 and 76 are maintained in spaced relationship and movable as a unit by means of an interconnecting end wall 78.

As shown more clearly in FIGURES 5 and 6, the tray assembly 56 is provided with upstanding side walls 80 and 82 extending upwardly from the bottom plate 76 for a distance less than the distance between plates 58 and 76. Side plate 36 is provided with a pair of guides 86 and side plate 38 is provided with a pair of guides 86' for reciprocally supporting plate 58. Side plate 36 is provided with a pair of guides 88 and side plate 38 is provided with a pair of guides 88' for reciprocally supporting the bottom plate 76.

The side walls 80 and 82 cooperate with the end wall 72 and bottom plate 76 to define a tray for receiving molded parts. A stationary abutment member 84 is supported by the sets of guides 86 and 86' and depends into the space between the side walls 80 and 82. The molded parts supported by the bottom plate 76 will abut against member 84 and be caused to discharge into the container 32 when the tray assembly 56 is reciprocated to a retracted position as illustrated in FIGURE 3. The end wall 72 prevents accidental discharge of the molded parts prior to arrival of the tray assembly in its retracted position. In such retracted position, the cam 90 supported by the side plates 36 and 38 cams the end wall 72 to the position illustrated in FIGURE 3, thereby facilitating discharge of the molded parts into the container 32.

As shown more clearly in FIGURES 3, 6 and 7, an elongated slot 92 is provided in the side plate 36 and an elongated slot 94 is provided in the side plate 38. A rod 96 extends through the slots 92 and 94 for reciprocation between the ends of the slots. To prevent inadvertent removal of the rod 96, cotter pins, nuts or the like may be provided on the extreme ends of the rod 96.

As shown more clearly in FIGURES 2 and 7, the height of the pins 68 and 70 corresponds generally to the distance between the upper surface of plate 58 and the rod 96. When the tray assembly 56 is in its retracted position as shown in FIGURES 3 and 7, the pin 68 has pushed the rod 96 to the lefthand end of the slots 92 and 94. When the tray assembly 56 is in its extended position as illustrated in FIGURE 2, the pin 70 has pushed the rod 96 to the righthand end of the slots 92 and 94.

A gate 98 is rotatably supported at its ends by the side plates 36 and 38. The gate 98 is provided with flaps 100 and 102 at its end portions. As shown more clearly in FIGURE 7, the flaps are in a plane substantially perpendicular to the plane of the gate 98. The provision of the flaps facilitates the movement of the gate 98 from the phantom position in FIGURE 7 to the solid line position in FIGURE 7 by the pin 68. The gate 98 is moved from the phantom to solid line position in FIGURE 7 by contact between the rod 96 and the flaps 100 and 102. The gate 98 and the flaps are provided with a notch 104 to facilitate the camming action involved.

The tray assembly 56 is provided with an actuator for selective reciprocation in timed relationship with respect to the actuator for the comb plate 44. The means for effecting such timing relationship in conjunction with the reciprocation of the first platen 22 is illustrated and described in my above-mentioned patents and need not be further described herein. Such description is incorporated herein by reference.

The actuator for the tray assembly 56 includes a piston rod 108 having one end secured to the end wall 78. The piston rod 108 extends through the end plate 40 and terminates at a piston disposed within the cylinder 106. Motive fluid is supplied to opposite sides of the piston by means of the conduits 110 and 112.

The operation of the stripper comb assembly of the present invention is as follows:

By conventional means not shown, the first platen 22 will be reciprocated to a closed disposition as illustrated in FIGURE 3. Molding material will be injected into the molding cavities 28 and the interconnecting runner channels. In a conventional manner, molded parts 118 interconnected by a cull and runner 116 will be formed.

At the end of the molding cycle, the first platen 22 will be moved to the position illustrated in FIGURE 2 and then the tray assembly 56 will be reciprocated to its extended position as illustrated in FIGURE 2. The ejection pins 30 will be stroked to separate the molded parts, cull and runner from the forces 26. The molded parts 118 will fall through the apertures 60, 62, 64 or 66 therebelow onto the solid portion of the plate 76.

Thereafter, the comb plate 44 will be reciprocated by its actuator to its extended position as illustrated in FIGURES 1 and 2 so that the fingers 46 straddle each of the ejection pins 30. By conventional means, the ejection pins will then be moved to their retracted position and the fingers 46 will positively separate any of the molded parts, cull or runner which are still attached to the ejection pins. The cull and runner 116 will be orientated with respect to the plate 58 so that they fall onto the solid portion of the plate 58 between the apertures 60, 62, 64 and 66.

Before the first platen 22 will be reciprocated toward the platen 24 to commence a new molding cycle, the comb plate 44 and the tray assembly 56 will be reciprocated to their retracted positions by their respective actuators. As the tray assembly 56 is reciprocated to its retracted position, the side walls 80 and 82 cooperate with the end wall 72 to prevent accidental discharge of the molded parts 118. As the tray assembly 56 moves to its retracted position, the abutment member 84 causes the molded parts 118 to move toward the end wall 72. Slightly before the tray assembly 56 has reached its retracted position, the cam 90 will cause the end wall 72 to pivot to the disposition illustrated in FIGURE 3 and the molded parts 118 will discharge into the container 32.

As the tray assembly 56 is moved to its retracted position, the gate 98 will be in the phantom position illustrated in FIGURE 7. As the tray assembly 56 approaches its retracted position, the pin 68 will abut against the rod 96 and reciprocate the same to the lefthand end of the slots 92 and 94. In doing so, the rod 96 will cam the flaps 100 and 102 to the solid line position illustrated in FIGURE 7 thereby rotating the gate 98 to the solid line position in FIGURE 7. It will be noted that the cull and runner 116 are now disposed inside the gate 98 above the chute 114 with the solid portion of the plate 76 disposed therebetween. When the tray assembly 56 is reciprocated to its extended position, the cull and runner 116 will abut against the gate 98 and be caused to discharge through the apertures 66 and 77, through the chute 114 and into the container 34. As the tray assembly 56 reaches its extended position, the pin 70 will move the rod 96 thereby rotating the gate 98 to the phantom position in FIGURE 7.

The above cycle will be repeated as described above with the molded parts 118 being discharged on the retracting stroke of the tray assembly 56 and the cull and runner 116 being discharged on the extending stroke of the tray assembly 56. If the cull and runner 116 includes small pieces, they will be scraped off the plate 58 by the gate 98 and may discharge onto the pate 76. However, such small pieces will be scraped by the abutment member 84 and caused to discharge through the chute 114 into the container 34. Thus, it will be seen that I have provided a stripper comb assembly which automatically separates the molded parts from the scrap and discharges the same into separate containers or the like.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a molding press adapted to produce molded parts interconnected by a runner, and a stripper comb assembly structurally interrelated with said press to automatically receive the molded parts and runner and discharge the molded parts into a first container and the runner into a second container, said stripper comb assembly including a reciprocable tray assembly for receiving the molded parts and runner and conveying the same to a position for discharge into the separate containers, said tray assembly including means for discharging the runner into said second container on the srtoke in one direction and means for discharging the molded parts into said container on the stroke in an opposite direction.

2. Apparatus comprising a molding press adapted to produce molded parts interconnected by a runner, and a stripper comb assembly structurally interrelated with said press to automatically receive the molded parts and runner and discharge the molded parts into a first container and the runner into a second container, said stripper comb assembly including a reciprocal tray assembly for receiving the molded parts and runner and conveying the same away from the press for discharge into the separate containers, said tray assembly including upper and lower plates, said upper plate having apertures above a solid portion of said lower plate, and said plates having enlarged apertures disposed one above the other.

3. A stripper comb assembly adapted to be utilized in conjunction with a molding press comprising side plates, a tray assembly reciprocally supported by said side plates, said tray assembly including upper and lower spaced members, said upper member having at least one aperture therein through which molded parts may fall onto a solid portion of said lower member below said aperture, an abutment member disposed in a plane between said upper and lower members and supported by at least one of said side plates for scraping molded parts off the lower member for discharge into a container, said abutment member being stationary with respect to said assembly, means for transferring runners on said upper member into a second container said last-mentioned means including enlarged apertures at one end of said upper and lower members, said abutment member being positioned to push runners off said upper member through said apertures on a forward stroke of said assembly.

4. A stripper comb assembly adapted to be utilized in conjunction with a molding press comprising side plates, a tray assembly reciprocally supported by said side plates, said tray assembly including upper and lower spaced members, said upper member having at least one aperture therein through which molded parts may fall onto said lower member, an abutment member disposed in a plane between said upper and lower members and supported by at least one of said side plates for scraping molded parts off the lower member for discharge into a container, and means for transferring runners on said upper member into a second container, including a pivotably mounted end wall on said tray assembly, and cam means supported by at least one of said side plates for camming said end wall to an open disposition, said end wall being in its open disposition when said tray assembly is in its retracted position.

5. A stripper comb assembly adapted to be utilized in conjunction with a molding press comprising side plates, a tray assembly reciprocally supported by said plates, said tray assembly including upper and lower spaced members, said upper member having at least one aperture therein through which molded parts may fall onto said lower member, an abutment member disposed in a plane between said upper and lower members and supported by at least one of said side plates for scraping molded parts off the lower member for discharge into a container, and means for transferring runners on said upper member into a second container, wherein said last-mentioned means includes a rotatably mounted gate supported by said side plates, means on said tray assembly for initiating closing movement of said gate as said tray assembly approaches its retracted position.

6. A stripper comb assembly adapted to be utilized with a molding press comprising a stationary support, a tray assembly reciprocally supported by said support for reciprocation between retracted and extended positions, said tray assembly including upper and lower plates, said upper plate having several apertures therein, said lower plate being imperforate below at least some of said apertures, said tray assembly including a pivotably mounted end wall at one end thereof, cam means on said support for moving said end wall from a closed to an open disposition, a fixed abutment adjacent said cam means for scraping molded parts off said lower plate and discharging the same through the open end of the tray assembly, and means supported by said support for moving runners off said upper plate for discharge into a container while said tray assembly is moving between its retracted and extended positions.

7. A stripper comb assembly in accordance with claim 6 wherein said last-mentioned means includes a rotatably mounted gate, a reciprocally supported member adjacent said gate, and pin members on said upper plate for reciprocating said member to rotate said gate.

8. A stripper comb assembly in accordance with claim 7 wherein said reciprocal member is a rod extending through elongated slots in said support, said gate being rotatably supported above said slots between the ends of said slots, and the height of said pin members being greater than the distance between said upper plate and the lowermost surface of said rod.

9. A stripper comb assembly in accordance with claim 7 wherein said last-mentioned means removes the runner from said upper plate while said tray assembly is moving from its retracted to its extended position.

10. A stripper comb assembly adapted to be utilized in conjunction with a molding press comprising side plates, a tray assembly reciprocally supported by said side plates, said tray assembly including upper and lower spaced members, said upper member having at least one aperture therein through which molded parts may fall onto said lower member, an abutment member disposed in a plane between said upper and lower members and supported by at least one of said side plates for scraping molded parts off the lower member for discharge into a container, and means for transferring runners on said upper member into a second container, including a rotatably mounted gate above said upper member, and means for rotating said gate between open and closed positions in response to said tray assembly approaching the opposite ends of its reciprocatory travel.

References Cited by the Examiner

UNITED STATES PATENTS

| | | | |
|---|---|---|---|
| 2,321,251 | 6/1943 | Sayre | 18—16 |
| 2,582,891 | 1/1952 | Strauss | 18—2 X |
| 2,923,976 | 2/1960 | Strauss | 18—30 |
| 2,983,953 | 3/1961 | Borah | 18—16 |

J. SPENCER OVERHOLSER, *Primary Examiner.*

J. H. FLINT, *Assistant Examiner.*